Jan. 27, 1959  R. D. JESSEE  2,871,422
RELAY
Filed Jan. 31, 1955

United States Patent Office 2,871,422
Patented Jan. 27, 1959

2,871,422
RELAY

Ralph D. Jessee, Lima, Ohio, assignor to Westinghouse Electric Corporation, East Pittsburgh, Pa., a corporation of Pennsylvania Application January 31, 1955, Serial No. 485,003

10 Claims. (Cl. 317—189)

This invention relates to relays and more particularly to overvoltage relays for use on aircraft.

On fighter aircraft or other vehicles where relatively large accelerations or decelerations are encountered, it is necessary to provide protective relays which will not operate, in the absence of a fault, in response to sudden changes of inertia or velocity. Heretofore, overvoltage relays were subject to false operation due to acceleration or deceleration which alters the calibration sufficient to cause the relay to operate in response to normal voltage.

An object of the invention is to provide a relay that is insensitive to physical acceleration.

Another object of the invention is to provide an improved relay for use on aircraft in which the calibration of the relay is unaffected by acceleration of the aircraft.

Another object of the invention is to provide an improved relay for use on aircraft in which the total series air gap of the relay is unaffected by acceleration of the aircraft.

The invention, both as to structure and operation, together with additional objects and advantages thereof, will be best understood from the following detailed description thereof when read in conjunction with the accompanying drawing.

Figure 2:
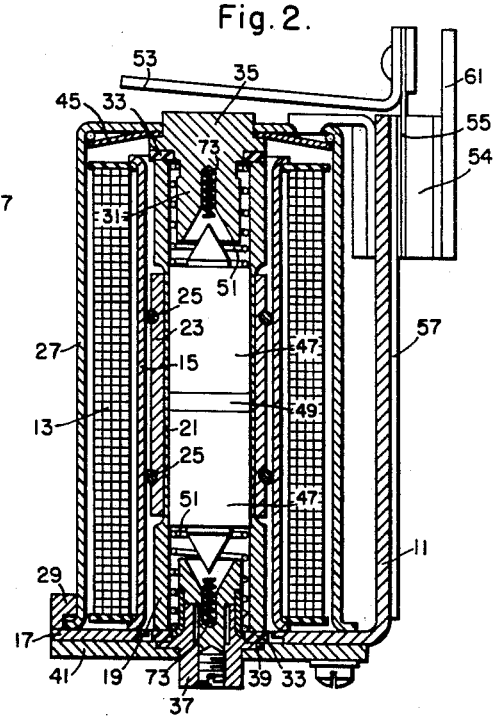
Figure 2 is a vertical sectional view through the relay.

Referring to Fig. 2 of the drawing, the relay comprises a frame or yoke 11 which supports an energizing coil 13. The coil 13 is mounted on an insulated tube 15 which is supported by a portion 17 of the yoke 11. Disposed within the tube 15 is an insulating tube 19 having a relatively thin central portion 21 about which is positioned a sleeve 23 comprising a plurality of segmental members of magnetic material held in place by means of clamping rings 25. A casing 27 enclosing the parts of the relay is also supported on the portion 17 of the yoke 11 and is held in place by a clamp ring 29 rigidly secured to the portion 17 of the yoke 11.

An upper core member 31 of magnetic material is provided with a flange which rests on the upper end of the tube 19 with a gasket 33 between the flange and the upper end of the tube. The core member has a portion 35 which extends upwardly through an opening in the top of the casing 27. A lower core member 37 is provided with a flange 39 which is supported in a counter bore in a plate 41 secured to the bottom of the portion 17 of the yoke 11. A gasket 33 is disposed between the flange 39 of the lower core member and the lower end of the tube 19. The upper core member 31, the tube 19 and the lower core member 37 are held in compression by means of a spring washer 45 engaging the flange on the upper core member 31 and the underside of the top portion of the casing 27.

Figure 1:
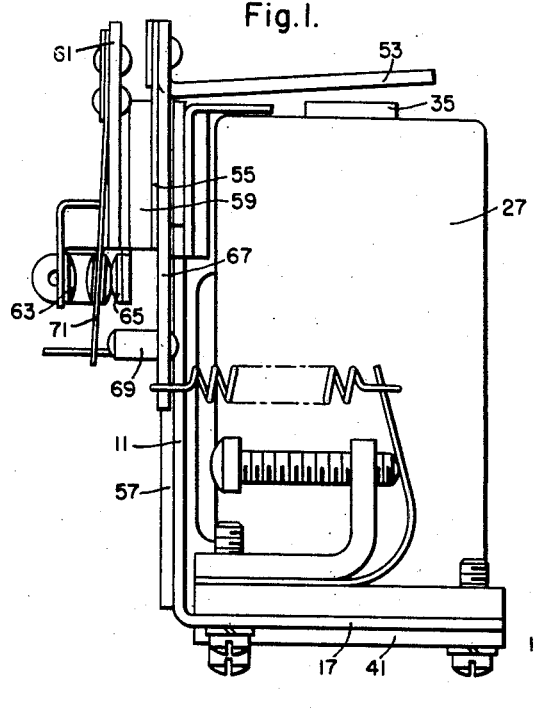
Figure 1 is an elevational view of a relay embodying the principles of the invention.

Disposed within the tube 19 is a pair of plungers 47 of magnetic material, the plungers being separated by a spacer 49 of non-magnetic material and biased to a neutral position by springs 51. An armature 53 is supported on a flat spring 55 for movement toward and away from the upper core member 31. The flat spring 55 is supported on a plate 57 secured to the vertical portion of the yoke or frame 11. Also mounted on the plate 57 by means of a spacer 59 is a terminal board 61 upon which is mounted a pair of spaced fixed contacts 63 and 65 (Fig. 1). Secured to the armature 53 is a downwardly extending member 67 having an insulating member 69 thereon which is adapted to engage and operate a spring contact carrying member 71 upon operation of the armature 53. The spring contact carrying member 71 is secured at its upper end to the terminal board 61. Coil springs 73 are disposed in the core members 31 and 37 to prevent sealing of the plungers due to leakage flux.

Figure 3:
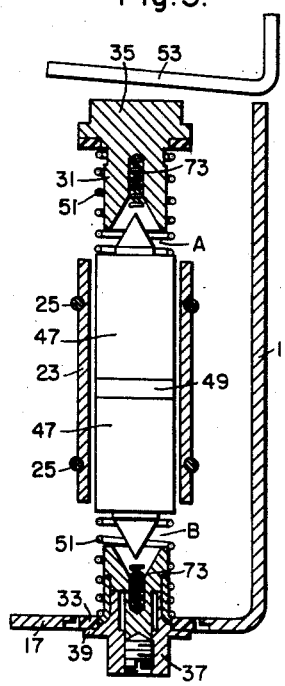
Figure 3 is a schematic view showing the flux path in the relay.

As shown in Fig. 3, in which the plungers 47 are shown in their central positions, air gaps A and B are provided respectively between the upper plunger 47 and the upper core member 31 and between the lower plunger 47 and the lower core member 37.

Figure 4:
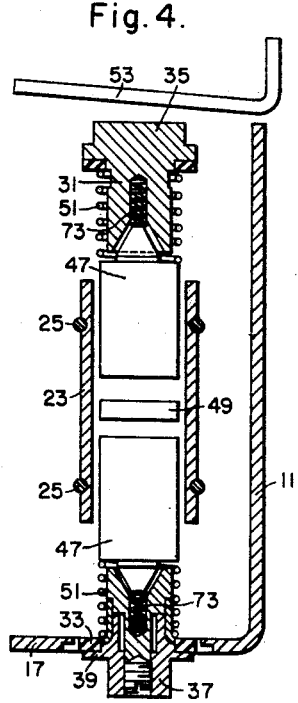
Figure 4 is a schematic view showing the relay in the operated condition.

When voltage is applied to the coil 13, the flux path (Fig. 3) is through the yoke 11, the lower core member 37, lower plunger 47, sleeve 23, upper plunger 47, upper core member 31, armature 53 and to the yoke 11. This flux produces forces on the plungers 47 tending to pull them in opposite directions toward the core members 31 and 37 closing the air gaps A and B (Fig. 4). As the air gaps between the plungers and their respective core members are reduced, the flux is increased, and when increased enough, produces a force to operate the armature 53. The plungers 47 move at a rate of speed which increases with the voltage on the coil, thus effecting an inverse time-voltage curve in the operation of the relay.

Figure 5:
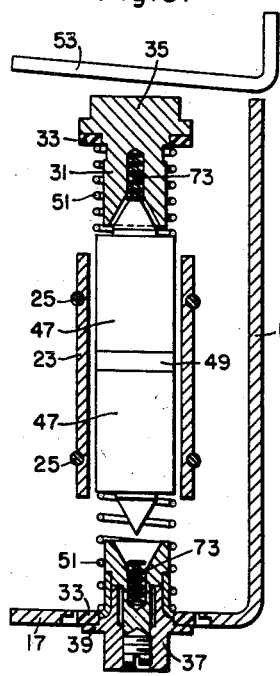
Figure 5 is a schematic view showing the parts in the position they assume in response to vertical downward acceleration.

If, during normal operation, that is, with normal line voltage applied to the coil, physical acceleration is applied to the relay in either vertical direction, both of the plungers 47 will move toward one of the core members and away from the other. Figure 5 illustrates the position of the plungers in response to a downward acceleration. It will be noted that the air gap A has been reduced while the air gap B has increased, but the total length of both of the air gaps A and B remains the same. The flux in the armature air gap, therefore, remains substantially the same and the magnetic force tending to operate the armature remains substantially constant. Upon removal of the acceleration, the plungers under the influence of the springs 51 return to their central or neutral position.

I claim as my invention:

1. A relay for use on a movable device comprising an energizing winding, an armature disposed adjacent to one end of said winding to be operated by energization of said winding, a plurality of movable magnetic members disposed within said winding and biased toward each other, a flux-carrying member positioned adjacent to and magnetically linking said movable members within said winding, said magnetic members being movable in opposite directions away from each other upon energization of said winding to effect operation of said armature, a non-magnetic member disposed between said magnetic members, said magnetic members moving in the same direction relative to said winding in response to a change in the velocity of said movable device to prevent false operation of said armature by changes in the velocity of said movable device.

2. A relay mounted on a moving vehicle comprising an energizing winding, an armature outside of said winding disposed to be operated by energization of said winding, a pair of movable magnetic members disposed within said winding, a flux-carrying member positioned adjacent to and magnetically linking said movable members within said winding, biasing means biasing said magnetic members toward each other, the flux due to energization of said winding causing said movable magnetic members to move in opposite directions toward the ends of said winding to thereby increase the flux and cause said flux to operate said armature, and both of said movable magnetic members in response to a change of velocity of said relay moving in the same direction relative to said winding thereby maintaining substantially constant flux to prevent operation of said armature in response to changes of velocity of said relay.

3. A relay mounted on a movable vehicle comprising an energizing winding, fixed core members one disposed at each end of said winding and extending into said winding, a movable armature disposed adjacent the outer end of one of said fixed core members to be operated upon energization of said winding, a pair of magnetic members disposed between said fixed core members and movable in opposite directions toward said fixed core members upon energization of said winding to effect operation of said armature, a flux-carrying member positioned adjacent to and magnetically linking said movable members within said winding, said magnetic members moving in the same direction toward one of said core members to prevent operation of said armature in response to sudden changes in the speed of said vehicle.

4. A relay for use on a moving vehicle comprising an energizing winding, a pair of spaced fixed core members extending into opposite ends of said winding, an armature adjacent the outer end of one of said fixed core members and operable by energization of said winding, a pair of movable magnetic members disposed within said winding between said fixed core members and biased inwardly from said core members to provide an air gap between each of the movable magnetic members and the adjacent core members, a flux-carrying member positioned adjacent to and magnetically linking said movable members within said winding, said magnetic members in response to energization of said winding moving in opposite directions toward said fixed core members to vary said air gaps and effect operation of said armature, both of said magnetic members moving in the same direction toward one of said fixed core members in response to changes in the speed of said vehicle to maintain a constant total air gap between said spaced core members to thereby prevent false operation of said armature.

5. A relay comprising an energizing winding, fixed core members one extending into each end of said winding, a pivoted armature adjacent the outer end of one of said fixed core members to be operated by energization of said winding, a pair of movable magnetic members disposed between said fixed core members in axial alignment therewith and movable in opposite directions toward said core members upon energization of said winding to effect operation of said armature, a flux-carrying member positioned adjacent to and magnetically linking said movable members within said winding, each of said movable magnetic members together with the adjacent core member providing an air gap, and both of said movable magnetic members in response to sudden longitudinal movement of said relay moving in the same direction toward one of said core members thereby maintaining a constant total air gap between said fixed core members to prevent false operation of said armature.

6. A relay comprising an energizing winding, fixed core members disposed at each end of said winding, each of said core members having a portion extending into said winding, a pivoted armature adjacent the outer end of one of said fixed core members to be operated upon energization of said winding, a pair of movable magnetic members disposed within said winding providing air gaps between said movable magnetic members and the adjacent fixed core members, a flux-carrying member positioned adjacent to and magnetically linking said movable members within said winding, said magnetic members upon energization of said winding moving in opposite directions toward said fixed core members to reduce said air gaps and effect operation of said armature, and said magnetic members in response to sudden longitudinal movement of said relay both moving in the same direction toward one of said fixed core members thereby maintaining a constant total air gap between said fixed core members.

7. A relay comprising an energizing winding, a fixed core member extending into each end of said energizing winding, a movable armature adjacent the outer end of one end of said fixed core members, a pair of movable magnetic members disposed between said fixed core members for movement within said energizing winding and biased to a neutral position providing an air gap between each of said magnetic members and the adjacent core members, a flux-carrying member positioned adjacent to and magnetically linking said movable members within said winding, said fixed core members and said movable magnetic members being disposed along the axis of said winding, energization of said winding causing said movable magnetic members to move in opposite directions toward said fixed core members reducing the air gaps between said movable magnetic members and said fixed core members to thereby effect operation of said armature, and said movable magnetic members in response to longitudinal acceleration of said relay both moving in the same direction toward one of said fixed core members while maintaining a constant overall air gap between said fixed core members.

8. An aircraft relay comprising a movable armature operable by energization of said relay, a pair of spaced fixed core members of magnetic material extending into opposite ends of said winding, a pair of movable magnetic members disposed between and in axial alignment with said fixed core members biased to a neutral position relative to said fixed core members and movable in opposite directions toward said fixed core members in response to energization of said relay causing operation of said armature, a flux-carrying member positioned adjacent to and magnetically linking said movable members within said winding, acceleration of said aircraft causing both of said movable magnetic members to move in the same direction toward one of said fixed core members thereby preventing false operation of said armature due to acceleration thereof.

9. A relay for use on aircraft comprising an armature operable by energization of said relay, spaced fixed magnetic members, a pair of movable magnetic members biased toward each other disposed between said fixed magnetic members, a flux-carrying member positioned adjacent to and magnetically linking said movable members within said winding, a member of non-magnetic material between said movable magnetic members, said movable magnetic members being so disposed and arranged that they move in opposite directions away from each other in response to energization of said relay to effect operation of said armature, and both movable magnetic members and said non-magnetic member moving in the same direction in response to acceleration of said relay to prevent operation of said armature in response to acceleration of said relay.

10. A relay for use on a vehicle comprising an armature operable by energization of said relay, spaced fixed magnetic members, a pair of movable magnetic members arranged between said fixed magnetic members and biased toward each other to provide a series air gap between said fixed magnetic members and said movable magnetic members, a flux-carrying member positioned adjacent to and magnetically linking said movable members within said winding, said movable magnetic members upon energization of said relay moving away from each other to vary said series air gap and effect operation of said armature, and said movable magnetic members upon acceleration of said vehicle maintaining a substantially constant series air gap between said fixed magnetic members to prevent false operation of said armature.

References Cited in the file of this patent
UNITED STATES PATENTS

| | | |
|---|---|---|
| 1,978,737 | Bower | Oct. 30, 1934 |
| 2,388,449 | Sundt | Nov. 6, 1945 |
| 2,451,323 | Doane | Oct. 12, 1948 |
| 2,474,742 | Kuhn | June 28, 1949 |
| 2,692,354 | Fisher | Oct. 19, 1954 |
| 2,749,402 | Tancred | June 5, 1956 |
| 2,756,302 | Baltuch | July 24, 1956 |